United States Patent
Baldemair et al.

(10) Patent No.: US 11,032,779 B2
(45) Date of Patent: Jun. 8, 2021

(54) USE OF CELL SPECIFIC REFERENCE SIGNALS FOR NR OPEN LOOP UPLINK POWER CONTROL

(71) Applicant: Telefonaktiebolaget LM Ericsson (publ), Stockholm (SE)

(72) Inventors: Robert Baldemair, Solna (SE); Daniel Chen Larsson, Lund (SE); Erik Dahlman, Stockholm (SE); Stefan Parkvall, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/637,108

(22) PCT Filed: Aug. 10, 2018

(86) PCT No.: PCT/SE2018/050810
§ 371 (c)(1),
(2) Date: Feb. 6, 2020

(87) PCT Pub. No.: WO2019/032033
PCT Pub. Date: Feb. 14, 2019

(65) Prior Publication Data
US 2020/0245255 A1    Jul. 30, 2020

Related U.S. Application Data

(60) Provisional application No. 62/544,013, filed on Aug. 11, 2017.

(51) Int. Cl.
*H04W 52/14* (2009.01)
*H04W 52/10* (2009.01)
*H04W 52/24* (2009.01)

(52) U.S. Cl.
CPC ........ *H04W 52/146* (2013.01); *H04W 52/10* (2013.01); *H04W 52/242* (2013.01)

(58) Field of Classification Search
CPC .. H04W 52/10; H04W 52/146; H04W 52/242
(Continued)

(56) References Cited

U.S. PATENT DOCUMENTS 6,026,307 A * 2/2000 Blom .................. H03J 5/244
                                                      332/127
10,721,693 B2 * 7/2020 Malladi ............... H04W 52/242
(Continued)

FOREIGN PATENT DOCUMENTS

WO    2012177207 A1    12/2012

OTHER PUBLICATIONS

International Search Report and Written Opinion dated Oct. 15, 2018 for International Application No. PCT/SE2018/050810 filed on Aug. 10, 2018, consisting of 11-pages.
(Continued)

*Primary Examiner* — Tan H Trinh
(74) *Attorney, Agent, or Firm* — Christopher & Weisberg. P.A.

(57) ABSTRACT

The present disclosure relates power control in wireless communications, to methods for open loop power control for setting the initial uplink transmission power for a wireless device capable of operating in multiple frequency bands. The disclosure includes methods for transmitting an uplink signal in an uplink channel of a first frequency band using an initial transmission power based on measurements of reference signals in the first frequency band when the received downlink channel is in a second frequency band not overlapping with the first frequency band. The disclosure also relates to corresponding devices and to a computer program for executing the proposed methods. Further,
(Continued)

embodiments relating to a host computer and activities therein, are also provided.

20 Claims, 14 Drawing Sheets

(58) Field of Classification Search
USPC .......... 455/69, 522, 506; 370/252, 279, 328, 370/329; 1/1
See application file for complete search history.

(56) References Cited

U.S. PATENT DOCUMENTS

| | | | |
|---|---|---|---|
| 2008/0069033 A1* | 3/2008 | Li | H04W 48/16 370/328 |
| 2010/0046464 A1* | 2/2010 | Kwak | H04L 5/0053 370/330 |
| 2011/0081927 A1* | 4/2011 | Gerstenberger | H04W 52/146 455/506 |
| 2011/0128893 A1* | 6/2011 | Park | H04W 74/0866 370/279 |
| 2011/0182201 A1* | 7/2011 | Pajukoski | H04B 17/24 370/252 |
| 2012/0044898 A1* | 2/2012 | Ishii | H04W 52/367 370/329 |
| 2013/0142113 A1* | 6/2013 | Fong | H04W 24/02 370/328 |
| 2013/0337861 A1 | 12/2013 | Bhogaraju et al. | |
| 2014/0177531 A1* | 6/2014 | Imamura | H04L 5/0035 370/328 |
| 2015/0146561 A1* | 5/2015 | Jung | H04L 5/0094 370/252 |
| 2016/0057760 A1* | 2/2016 | Yokomakura | H04W 72/0473 370/329 |
| 2016/0066284 A1* | 3/2016 | Kwon | H04W 72/0413 370/329 |
| 2016/0227493 A1* | 8/2016 | Kwak | H04W 72/044 |
| 2016/0381672 A1* | 12/2016 | Kim | H04W 52/383 370/329 |
| 2017/0195033 A1* | 7/2017 | Zhang | H04B 17/309 |
| 2018/0007640 A1* | 1/2018 | Lee | H04W 52/367 |
| 2018/0213485 A1* | 7/2018 | Sundararajan | H04W 52/242 |
| 2019/0342061 A1* | 11/2019 | Kim | H04L 5/0037 |
| 2019/0357264 A1* | 11/2019 | Yi | H04L 5/001 |
| 2020/0037254 A1* | 1/2020 | Comsa | H04B 7/0404 |
| 2020/0077451 A1* | 3/2020 | You | H04W 74/0833 |
| 2020/0163023 A1* | 5/2020 | Pelletier | H04W 72/042 |

OTHER PUBLICATIONS

3GPP TSG RAN WG1 NR Ad Hoc Meeting R1-1709979; Title: Overview of NR UL for LTE-NR coexistence; Agenda Item: 5.1.8; Source: Huawei, HiSilicon; Document for: Discussion and decision; Location and Date: Qingdao, China Jun. 27-30, 2017, consisting of 12-pages.

3GPP TSG-RAN WG1 NR AdHoc R1-1710904; Title: Uplink transmission in NR NSA mode; Agenda Item: 5.1.8; Source: Apple Inc.; Document for: Discussion/Decision; Location and Date: Qingdao, P.R. China Jun. 27-30, 2017, consisting of 7-pages.

3GPP TR 38.802 V14.0.0; 3rd Generation Partnership Project; Technical Specification Group Radio Access Network; Study on New Radio Access Technology Physical Layer Aspects (Release 14); Mar. 2017, consisting of 144-pages.

* cited by examiner

| Band | Duplex Mode | Uplink (MHz) | Downlink (MHz) | Alias | Frequencies used in Regions (2G, 3G, 4G) |
|---|---|---|---|---|---|
| 1 | FDD | 1920 – 1980 | 2110 – 2170 | UMTS, IMT 2100 | Europe, Asia, Africa, Australia, Latin America |
| 2 | FDD | 1850 – 1910 | 1930 – 1990 | PCS1900 | Americas, Asia |
| 3 | FDD | 1710 – 1785 | 1805 – 1880 | DCS1800 | Europe, Asia, Latin America, Africa, AUS, NZ |
| 4 | FDD | 1710 – 1755 | 2100 – 2155 | AWS | Americas |
| 5 | FDD | 824 – 849 | 869 – 894 | Cellular850, LTE850 | Americas, Asia, Australia, NZ |
| 6 | FDD | 830 – 840 | 875 – 885 | | |
| 7 | FDD | 2500 – 2570 | 2620 – 2690 | IMT-E2600 | Europe, Latin America, Canada, Asia, Africa, Australia |

FIG. 1A

| | | | | | |
|---|---|---|---|---|---|
| 8 | FDD | 880 – 915 | 925 – 960 | GSM900 & EGSM900 | Europe, Asia, Africa, Australia, New Zealand |
| 9 | FDD | 1749.9 – 1784.9 | 1844.9 – 1879.9 | UMTS1700 | Japan |
| 10 | FDD | 1710 – 1770 | 2100 – 2170 | AWS-1, Extended AWS blocks A-I | Americas |
| 11 | FDD | 1427.9 – 1447.9 | 1475.9 – 1495.9 | Lower PDC (Personal Digital Cellular) | Japan (KDDI) |
| 12 | FDD | 699 – 716 | 729 – 746 | LTE 700 lower SMH blocks A/B/C | US (C Spire & US Cellular) |
| 13 | FDD | 777 – 787 | 746 – 756 | LTE 700 upper SMH Block C | Americas (Verizon) |
| 14 | FDD | 788 – 798 | 758 – 768 | LTE 700 upper SMH Block D | Americas (D-Block, Public Safety) |
| 17 | FDD | 704 – 716 | 734 – 746 | LTE 700 lower SMH Blocks B/C | Americas (AT&T) |

FIG. 1B

| 18 | FDD | 815 – 830 | 860 – 875 | | Japan (KDDI) |
| --- | --- | --- | --- | --- | --- |
| 19 | FDD | 830 – 845 | 875 – 890 | 800 MHz | Japan (NTT docomo) |
| 20 | FDD | 832 – 862 | 791 – 821 | EU Digital Dividend 800 MHz | Europe |
| 21 | FDD | 1477.9 – 1462.9 | 1495.9 – 1510.9 | PDC | Japan (NTT docomo) |
| 22 | FDD | 3410 – 3490 | 3510 – 3590 | | |
| 23 | FDD | 2000 – 2020 | 2180 – 2200 | | |
| 24 | FDD | 1626.5 – 1660.5 | 1525 – 1559 | | |
| 25 | FDD | 1850 – 1915 | 1930 – 1995 | PCS A-G | US (Sprint) |
| 26 | FDD | 814 – 849 | 859 – 894 | ESMR 800 | US (Sprint) |
| 27 | FDD | 807 – 824 | 852 – 869 | | |
| 28 | FDD | 703 – 748 | 758 – 803 | 700 MHz (Asia Pacific) | Asia-Pacific |

FIG. 1C

| 29 | FDD / CA | | 717 – 728 | Lower SMH blocks D,E (for carrier aggregation only) | USA (AT&T, DISH) |
|---|---|---|---|---|---|
| 30 | FDD | 2305 – 2315 | 2350 – 2360 | WCS blocks A,B | USA (AT&T) |
| 31 | FDD | 452.5 – 457.5 | 462.5 – 467.5 | | no deployments |
| 32 | FDD / CA | | 1452 – 1496 | L-Band (for carrier aggregation only) | no deployments |
| 33 | TDD | 1900 – 1920 | 1900 – 1920 | Pre IMT | EUR, ASIA, Oceania (no deployments yet) |
| 34 | TDD | 2010 – 2025 | 2010 – 2025 | IMT | EUR, ASIA, Oceania (no deployments yet) |
| 35 | TDD | 1850 – 1910 | | PCS (uplink) | NA, LA (no deployments yet) |
| 36 | TDD | | 1930 – 1990 | PCS (downlink) | NA, LA(no deployments yet) |

FIG. 1D

| | | | | | |
|---|---|---|---|---|---|
| 37 | TDD | 1910 – 1930 | 1910 – 1930 | PCS (duplex spacing) | Canada, Brazil, Poland, Russia, Spain, Sweden, Saudi Arabia, Ghana, Uganda |
| 38 | TDD | 2570 – 2620 | 2570 – 2620 | IMT-E2600 (duplex spacing) | Europe, Asia, Canada, South Korea |
| 39 | TDD | 1880 – 1920 | 1880 – 1920 | DCS-IMT gap | China (China mobile) |
| 40 | TDD | 2300 – 2400 | 2300 – 2400 | | Russia, Australia, Vanuatu |
| 41 | TDD | 2496 – 2690 | 2496 – 2690 | BRS / EBS | USA, China, Telecom, Japan |
| 42 | TDD | 3400 – 3600 | 3400 – 3600 | | Canada, Chile, Belgium, UK, Bahrain, Japan |
| 43 | TDD | 3600 – 3800 | 3600 – 3800 | | UK |
| 44 | TDD | 703 – 803 | 703 – 803 | APT | China (trial) |

FIG. 1E

| | | | | | |
|---|---|---|---|---|---|
| 45 | TDD | 1447 – 1467 | 1447 – 1467 | L-Band (China) | China |
| 46 | TDD | 5150 – 5925 | 5150 – 5925 | NII | |
| 65 | FDD | 1920 – 2010 | 2110 – 2200 | Extended IMT | |
| 66 | FDD | 1710 – 1780 | 2110 – 2200 | Extended AWS Blocks A-J AWS-1 / AWS-3 | |
| 67 | FDD / CA | | 738 – 758 | EU700 | Europe |
| 68 | FDD | 698 – 729 | 753 – 758 | ME700 | |
| 69 | FDD / CA | | 2570 – 2620 | IMT-E | |
| 70 | FDD | 1695 – 1710 | 1995 – 2020 | AWS-3 A1/B1 – EPCS H | |

FIG. 1F

S1
TRANSMIT INFORMATION REGARDING A TRANSMISSION ON A DOWNLINK CHANNEL OF THE SECOND FREQUENCY BAND TO THE WIRELESS DEVICE

S2
RECEIVE, FROM THE WIRELESS DEVICE, A TRANSMISSION ON THE UPLINK CHANNEL OF A FIRST FREQUENCY BAND USING AN INITIAL UPLINK TRANSMISSION POWER WHICH IS SET BASED ON THE TRANSMITTED INFORMATION

FIG. 8

USE OF CELL SPECIFIC REFERENCE SIGNALS FOR NR OPEN LOOP UPLINK POWER CONTROL

CROSS-REFERENCE TO RELATED APPLICATIONS

This application is a Submission Under 35 U.S.C. § 371 for U.S. National Stage Patent Application of International Application No.: PCT/SE2018/050810, filed Aug. 10, 2018, entitled "USE OF CELL SPECIFIC REFERENCE SIGNAL FOR NR OPEN LOOP UPLINK POWER CONTROL," which claims priority to U.S. Provisional Application No. 62/544,013, filed Aug. 11, 2017, the entireties of both of which are incorporated herein by reference.

TECHNICAL FIELD

The present disclosure relates power control in wireless communications. More specifically, the proposed technique relates to methods for open loop power control for setting the initial uplink transmission power for a wireless device capable of operating in multiple frequency bands. The disclosure comprises methods for transmitting an uplink signal in an uplink channel of a first frequency band using an initial transmission power based on measurements of reference signals in said first frequency band when the received downlink channel is in a second frequency band not overlapping with the first frequency band. The disclosure also relates to corresponding devices and to a computer program for executing the proposed methods, and to a carrier containing said computer program. Further, embodiments relating to a host computer and activities therein, is also comprised in the current disclosure.

BACKGROUND

LTE Frequency Bands & Spectrum Allocations

In the radio access technology (RAT) Long Term Evolution, LTE, there are many possible frequencies on which transmission can occur, depending on for example the location of the band (which part of the world), if the transmission is using frequency division duplex, FDD, or time division duplex, TDD, and whether it is uplink (UL) or downlink (DL). There are many frequency bands used for LTE TDD and FDD versions. The spectrum allocated for LTE varies around the world, and as a result there are many LTE bands and frequency allocations. There is a growing number of LTE frequency bands that are being designated as possibilities for use with LTE. Many of the LTE frequency bands are already in use for other cellular systems, whereas other newer LTE bands have been introduced as other users are re-allocated spectrum elsewhere. FDD spectrum requires paired bands, one for the uplink and one for the downlink, while TDD requires a single band since uplink and downlink are on the same frequency but time separated. As a result, there are different LTE band allocations for TDD and FDD. In some cases these bands may overlap, and it is therefore feasible, although unlikely, that both TDD and FDD transmissions could be present on a particular LTE frequency band. The greater likelihood is that a single user equipment (UE) or mobile device will need to detect whether a TDD or FDD transmission should be made on a given band. UEs that roam may encounter both types on the same band. They will therefore need to detect what type of transmission is being made on that particular LTE band in its current location. The different LTE frequency allocations or LTE frequency bands are allocated numbers. Currently the LTE bands between 1 & 22 are for paired spectrum, i.e. FDD, and LTE bands between 33 & 41 are for unpaired spectrum, i.e. TDD.

There is a large number of allocations of radio spectrum that has been reserved for FDD LTE use. The FDD LTE frequency bands are paired to allow simultaneous transmission on two frequencies. The bands also have a sufficient separation to enable the transmitted signals not to unduly impair the receiver performance. If the signals are too close then the receiver may be "blocked" and the sensitivity impaired. The separation must be sufficient to enable the roll-off of the antenna filtering to give sufficient attenuation of the transmitted signal within the receive band. In TDD LTE, there are several unpaired frequency allocations that are being prepared for LTE TDD use. The TDD LTE bands are unpaired because the uplink and downlink share the same frequency, being time multiplexed. FIGS. 1A-1F shows the LTE E-UTRAN 3GPP Frequency bands. More specifically, FIG. 1A shows a table including FDD LTE bands. FIG. 1B shows a continuation of the table shown in FIG. 1A including other FDD LTE bands. FIG. 1C shows a continuation of the table shown in FIG. 1B including some other FDD LTE bands. FIG. 1D shows a continuation of the table shown in FIG. 1C including some other FDD LTE bands and TDD LTE bands. FIG. 1E shows a continuation of the table shown in FIG. 1D including some other TDE LTE bands. FIG. 1F shows a continuation of the table shown in FIG. 1E including some other TDD and FDD LTE bands. Even though the frequencies shown in FIGS. 1A-1F differ a bit in FDD LTE, they basically stay within the range of 700-3600 MHz, which in this disclosure is referred to as a "low" frequency band or "low band".

New Radio (NR) Spectrum 5G wireless access will be realized by the evolution of LTE for existing spectrum in combination with new radio access technologies that primarily target new spectrum. Due to the scarcity of available spectrum, spectrum located in very high frequency ranges (compared to the frequencies that have so far been used for wireless communication), such as 10 GHz and above, are planned to be utilized for future mobile communication systems. Thus, evolving to 5G includes work on a New Radio (NR) Access Technology (RAT), also known as 5G or next generation (NX). The NR air interface targets spectrum in the range from sub-1 GHz (below 1 GHz) up to 100 GHz with initial deployments expected in frequency bands not utilized by LTE. These "new" higher frequencies targeted by NR are thus referred to as a "high" frequency band in this disclosure or "high band". The center frequency fc for the low frequency band is typically around 2 GHz and the center frequency fc for the high frequency band is typically around 10 GHz. High bands may also be referred to as millimeter bands or millimeter wave, mmW.NR transmission will thus be possible both on the lower "LTE" frequency bands and on the higher "NR" frequency bands.

Although NR targets a wide range of frequency bands, it is not likely that additional low frequencies will be available. Instead, the low frequency bands are to a large extent already used by LTE and may be hard to migrate to other RATs as there are a large number of LTE devices in operation. Operators have therefore asked to support coexistence of LTE and NR on an existing frequency band where LTE is already being deployed.

Physical Resources in LTE

Physical resources for RATs used in wireless communication networks, such as LTE and NR, may be scheduled in time and frequency in what could be seen as a time and frequency grid. For example, the basic downlink physical resource of the RAT LTE can be seen as a time-frequency grid as illustrated in FIG. 2. LTE uses Orthogonal Frequency Division Multiplexing (OFDM) in the downlink (DL) and a pre-coded version of OFDM called Single Carrier Frequency Division Multiple Access (SC-FDMA) in the uplink (UL). LTE uses OFDM to transmit the data over many narrow band carriers, usually of 180 KHz each, instead of spreading one signal over the complete 5 MHz carrier bandwidth. In other words OFDM uses a large number of narrow sub-carriers for multi-carrier transmission to carry data. OFDM is thus a so called multi carrier system. Multi carrier systems are systems that uses multiple sinusoidal waves of predefined frequencies as multiple subcarriers. In multicarrier systems, data are divided on the different subcarriers of one transmitter. The difference between the frequencies of two adjacent subcarriers is called the frequency domain subcarrier spacing or subcarrier spacing (SCS) for short. The OFDM symbols are grouped into so called physical resource blocks (PRB) or just resource blocks (RB). The basic unit of transmission in LTE is a RB, which in its most common configuration consists of 12 subcarriers and 7 OFDM symbols (one slot). In LTE the resource blocks have a total size of 180 kHz in the frequency domain and 0.5 ms (one slot) in the time domain. Each element in the time-frequency grid containing one symbol and one subcarrier is referred to as a resource element (RE). Each 1 ms Transmission Time Interval (TTI) consists of two slots (Tslot), usually represented by 14 OFDM symbols. LTE downlink transmissions are organized into radio frames of 10 ms, each radio frame consisting of ten equally-sized subframes of length Tsubframe=1 ms, as shown in FIG. 3. The resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth. Some LTE terminology is used in this disclosure in a forward looking sense, to include equivalent 5G entities or functionalities although a different term may be specified in 5G. A general description of the agreements on 5G New Radio (NR) Access Technology so far is contained in 3GPP TR 38.802 V14.0.0 (2017-03). Final specifications may be published inter alia in the future 3GPP TS 38.2** series.

Physical Resources in NR

The new RAT NR will use a similar structure for the physical resources as LTE, using multiple carriers in frequency and symbols in the time domain, defining resource elements of physical resource blocks. The physical resource parameters may vary in NR. For example, the carriers may span a variable frequency range, the frequency spacing or density between the carriers may vary, as well as the cyclic prefix (CP) used. The frequency spacing between subcarriers can be seen as the frequency bandwidth between the center of a subcarrier and the adjacent subcarrier, or the bandwidth occupied by each subcarrier in the frequency band. A resource defined by one subcarrier and one symbol is called a resource element (RE).

It has been proposed that the duration of the subframes in NR should always have a duration of 1 ms, and that the transmission could be flexibly defined by using slots, the slots being proposed to contain 14 time symbols (symbols of a defined time duration), such as OFDM (DFTS-OFDM, Discrete Fourier Transform Spread OFDMA) or SC-FDMA. The use of so called "mini-slots" have also been proposed which could have a variable length (any duration of symbols) and start position, thus they could be located anywhere in the slots, and could be as short as one symbol long. NR defines different slot formats or slot configurations, a slot can be 14 symbols which is also referred to as a slot interval, a slot duration can be a pure UL slot or it can have a DL control region, a slot duration can accommodate differently long guard periods between duplex directions, multiple slots can be aggregated, numerologies with extended cyclic prefix result in fewer symbols per slot. A "slot" could also refer to the length in symbols of a transmission.

NR architecture is being discussed in 3GPP and the current concept is illustrated in FIG. 4, where eNB denotes LTE eNodeB, gNB denotes an NR BS (one NR BS may correspond to one or more transmission/reception points), and the lines between the nodes illustrate the corresponding interfaces which are under discussion in 3GPP.

Numerologies

A numerology defines basic physical layer parameters, such as subframe structure and may include transmission bandwidth, subframe duration, frame duration, slot duration, symbol duration, subcarrier spacing, sampling frequency, number of subcarrier, RB per subframe, symbols per subframe, CP length etc. The exact values for the numerology elements in different RATs are typically driven by performance targets. However, the numerology used so far in the existing RATs (e.g. LTE) is rather static and typically can be trivially derived by the user equipment (UE) or wireless device. The support of multiple numerologies has been agreed for NR, which numerologies can be multiplexed in the frequency and/or time domain for the same or different UEs. Different numerologies may thus coexist on the same subcarrier. The term numerology may characterize any one or more of: frame duration, subframe or TTI duration, slot duration, min-slot duration, symbol durations subcarrier spacing, number of subcarriers per physical channel (e.g. RB), number of RBs within the bandwidth. A numerology in NR may be defined by subcarrier spacing and CP overhead.

Channel Estimation in LTE

In LTE demodulation of sent data requires estimation of the radio channel which is done by using transmitted reference symbols/reference signals (RSs), i.e. symbols known by the receiver. In LTE, cell specific reference symbols/signals (CRS) are transmitted in all downlink subframes and, in addition to assist downlink channel estimation, they are also used for mobility measurements performed by the UEs. LTE also supports UE specific RSs aimed only for assisting channel estimation for demodulation purposes.

In order to support mobility, a terminal (e.g. UE) needs to continuously search for, synchronize to, and estimate the reception quality of both its serving cell and neighbor cells. The reception quality of the neighbor cells, in relation to the reception quality of the current cell, is then evaluated in order to conclude if a handover (for terminals in connected mode) or cell re-selection (for terminals in idle mode) should be carried out. For terminals in connected mode, the handover decision is taken by the network based on measurement reports provided by the terminals. Examples of such reports are reference signal received power (RSRP) and reference signal received quality (RSRQ). Depending on how these measurements, possibly complemented by a configurable offset, are used the UE can for example be connected to the cell with the strongest received power, or the cell with the best path gain, or something between the two. These selection strategies do not result in the same selected cell, as the base station output powers of cells of different types are different. This is sometimes referred to as link imbalance. For example, the output power of a pico base station or a relay is in the order of 30 dBm or less, while a macro base station can have an output power of 46 dBm. Consequently, even in the proximity of the pico cell, the downlink signal strength from the macro cell can be larger than that of the pico cell. From a downlink perspective, it is often better to select cell based on downlink received power, whereas from an uplink perspective, it would be better to select cell based on the pathloss. Thus, the UE makes an estimation of the pathloss based on an estimation of the received downlink signal, which it uses for setting the transmission power on the uplink.

Power Control in LTE

Power control in telecommunication is used e.g. to maintain the link quality in uplink and downlink by adjusting the powers and to mitigate the near far effect by providing minimum required power levels for each connection. Power control provides protection against shadowing and fast fading, minimizes the interference in the network, thus improves capacity and quality and can be used to extend the battery life of the UE. Power control loops could be open or closed, where the open is used for setting the initial power and the closed for adjusting the transmit power. FIG. 5 shows an illustration of open and closed loop power control in LTE.

Open loop power control is the ability of the UE transmitter to set its output power to a specific value. It is used for setting coarse initial uplink and downlink transmission powers when a UE is accessing the network, i.e. during random access. The open loop power control tolerance is ±9 dB (normal conditions) or ±12 dB (extreme conditions). Open loop power control cannot track (and compensate) fast fading, since fast fading is different in uplink and downlink (when different frequencies are used). The average pathloss in the uplink can be estimated from the downlink though, as the pathloss is essentially identical in uplink and downlink given the small frequency separation of the two.

In open loop power control the transmission (UE Tx) power of the UE is estimated by:
- measuring the received power from the base station (BS)
- determining the power-loss in the downlink channel based on knowledge of the base station transmission (BS Tx) power
- adjusting the UE Tx power according to the estimated power-loss.

The UE receives a pilot channel and estimates the power strength. Based on this estimate, the UE adjusts the transmit power accordingly. During this open loop control, it is assumed that both downlink (from BS to UE) and uplink (from UE to BS) are correlated. Open-loop power control is used for PRACH (physical random access channel) at initial access (Random Access), PUSCH (physical uplink shared channel) and PUCCH (physical uplink control channel) as part of UL power control.

For example, in LTE the power of the PRACH, $P_{PRACH}$ could be calculated as:

$$P_{PRACH}=\min\{P_{max}, BSR \times Pwr+PL+(\text{power ramping step})\}$$

where $P_{cmax}$ is the maximum allowable UE power, BSR×Pwr is the target BS received power, PL is the pathloss, and the power ramping step is a counter that powers up each attempt by 2 dB. The pathloss estimation is calculated in the UE in dB as PL=referenceSignalPower−higher layer filtered RSRP, where the referenceSignalPower is provided by higher layers in SIB2.

The UE transmit power for PUSCH could be calculated as:

$$P_{PUSCH}=\min\{P_{max}, 10\log_{10}M+P_{0\_PUSCH}+\alpha \cdot PL+\Delta_{TF}+f(i)\}$$

where $P_{max}$ is the maximum allowable UE power, M is the number of scheduled resource blocks (transmitted on PDCCH), PL is the downlink pathloss estimated by the UE (UE uses measurements of DL pathloss to estimate UL pathloss). α is to enable fractional pathloss compensation, $P_{0\_PUSCH}$ is set according to SINR target (a parameter set to fulfill the HARQ (hybrid automatic repeat request) operating Point (OPP) quality requirements using the most efficient MCS) and $P_{0\_PUSCH}$ is broadcasted on BCCH SIB2. $\Delta_{TF}$ is a transport format (TF) specific offset.

FDD on Low and High Bands

In NR it will be possible to both use the low and high frequency bands described above. Thus, in FDD NR, or other RAT with multiple numerologies and/or configurable subcarrier spacings, it may be possible for a dual mode UE, a UE able to use several RATs such as LTE and NR, to transmit uplink and receive downlink on vastly different frequency bands, such as the low and high frequency bands described above, which is not possible for legacy UEs, such as LTE UEs which transmit and receive within roughly the same frequency band and use only a single numerology for all transmissions. Thus, for LTE-NR coexistence, new problems might arise.

Estimating the channel properties in NR FDD where the uplink transmitted on the low frequency bands (LTE frequency bands) and the downlink received on the high frequency bands (new NR spectrum band) using the legacy methods in LTE is not suitable since the pathloss will be estimated on the downlink high frequency band ("new" NR frequencies) while the uplink transmission will be in the low frequency band (LTE frequencies). The estimation would then be made on a different channel compared to the channel on which the transmission is to be made, hence the estimation cannot be used according to the open loop power control for setting the uplink transmission power since the open loop power control relies on the assumption that the power-loss in the uplink and downlink channel are similar.

Thus, there is a need to solve the problems arising from LTE-NR coexistence. One issue is to be able to set the initial uplink transmission power for systems transmitting and receiving on different frequency bands.

SUMMARY

An object of the present disclosure is to provide methods and devices which seek to mitigate, alleviate, or eliminate the above-identified deficiencies in the art and disadvantages singly or in any combination. This object is obtained by a method for use in a wireless device in a wireless communication system, the wireless device being capable of communicating by transmitting uplink within a first frequency band and receiving downlink within a second frequency band, for setting an initial uplink transmission power, the method comprising obtaining information regarding a transmission on a downlink channel of the second frequency band, and setting an initial uplink transmission power for a transmission on an uplink channel of the first frequency band based on the obtained information, where the first frequency band has a different center frequency than the second frequency band.

According to some aspects, the method further comprises estimating a pathloss of the downlink channel based on the obtained information.

According to some aspects, the method further comprises transmitting on the uplink channel of the first frequency band using the set initial uplink transmission power.

According to some aspects, the disclosure proposes a method for use in a network node in a wireless communication system for receiving an uplink transmission in a first frequency band form a wireless device capable of communicating by transmitting uplink within a first frequency band and receiving downlink within a second frequency band, the method comprising transmitting information regarding a transmission on a downlink channel of the second frequency band to the wireless device, and receiving, from the wireless device, a transmission on the uplink channel of a first frequency band using an initial uplink transmission power which is set based on the transmitted information, where the first frequency band has a different center frequency than the second frequency band.

According to some aspects, the disclosure proposes a wireless device, configured to operate in a wireless communication system and being capable of communicating by transmitting uplink within a first frequency band and receiving downlink within a second frequency band, configured for setting an initial uplink transmission power, the wireless device (10) comprising a communication interface (11) and processing circuitry (12) configured to cause the wireless device (10) to obtain information regarding a transmission on a downlink channel of the second frequency band, and to set an initial uplink transmission power for a transmission on an uplink channel of the first frequency band based on the obtained information, where the first frequency band has a different center frequency than the second frequency band.

In one aspect, the processing circuitry is further configured to estimate a pathloss of the downlink channel based on the obtained information. In a further aspect, the processing circuitry is further configured to transmit on the uplink channel of the first frequency band using the set initial uplink transmission power.

According to some aspects, the disclosure proposes a network node being configured to operate in a wireless communication system (100), configured for receiving a physical uplink control channel from a wireless device (10), the network node (20) comprising a communication interface (21); and processing circuitry (22) configured to cause the network node (20) to transmitting information regarding a transmission on a downlink channel of the second frequency band to the wireless device (10) and to receive, from the wireless device (10), a transmission on the uplink channel of a first frequency band using an initial uplink transmission power which is set based on the transmitted information, where the first frequency band has a different center frequency than the second frequency band.

According to some aspects, the disclosure proposes a computer program comprising computer program code which, when executed in a wireless device, causes the wireless device to execute the methods described below and above.

According to some aspects, the disclosure proposes a computer program comprising computer program code which, when executed in a network node, causes the network node to execute the methods described below and above.

According to some aspects, the disclosure proposes a carrier containing the computer program, wherein the carrier is one of an electronic signal, optical signal, radio signal, or computer readable storage medium.

BRIEF DESCRIPTION OF THE DRAWINGS

FIG. 1A shows a first group of frequency bands of the LTE E-UTRAN 3 GPP Frequency bands.

FIG. 1B shows a second group of frequency bands of the LTE E-UTRAN 3 GPP Frequency bands.

FIG. 1C shows a third group of frequency bands of the LTE E-UTRAN 3 GPP Frequency bands.

FIG. 1D shows a fourth group of frequency bands of the LTE E-UTRAN 3 GPP Frequency bands.

FIG. 1E shows a fifth group of frequency bands of the LTE E-UTRAN 3 GPP Frequency bands.

FIG. 1F shows a sixth group of frequency bands of the LTE E-UTRAN 3 GPP Frequency bands.

FIG. 8 is a flowchart of an exemplary process for receiving receive an uplink transmission on an uplink channel using an initial uplink transmission power set based on measurements of downlink reference signals on a downlink channel of the first frequency band transmitted by the network node.

DETAILED DESCRIPTION

Figure 2:
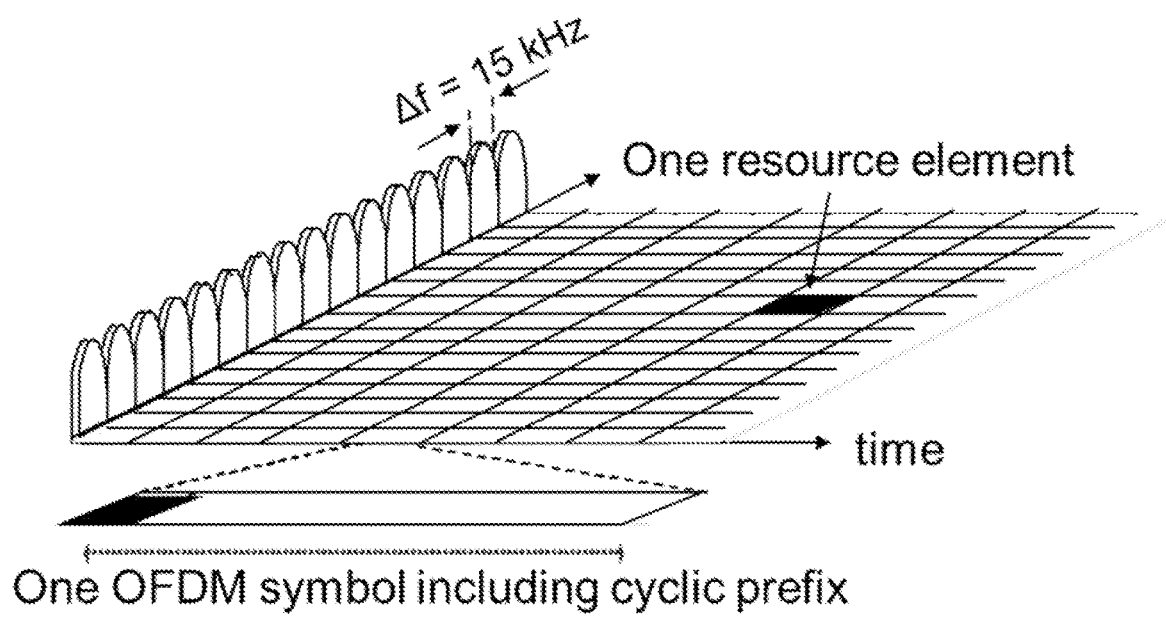
FIG. 2 illustrates the LTE downlink physical resource seen as a time/frequency grid.
Figure 3:
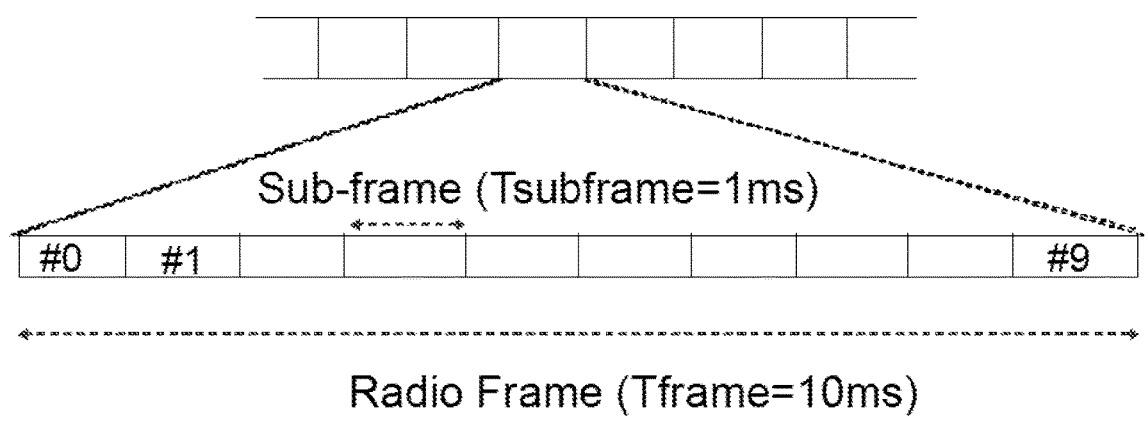
FIG. 3 is an illustration of the LTE time-domain structure.
Figure 4:
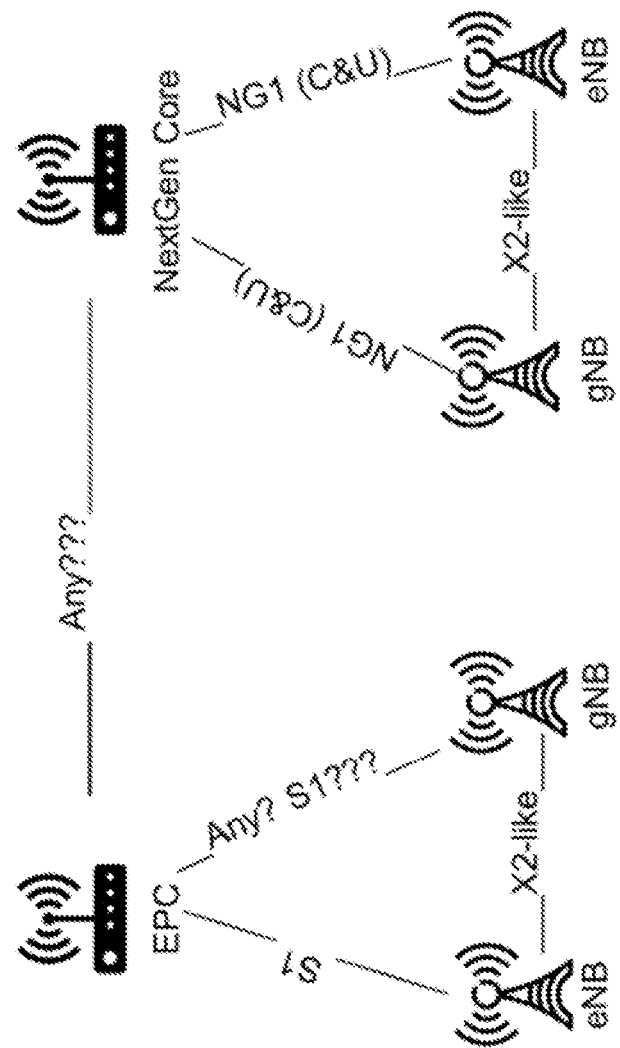
FIG. 4 is an illustration of the current concept for NR architecture.
Figure 5:
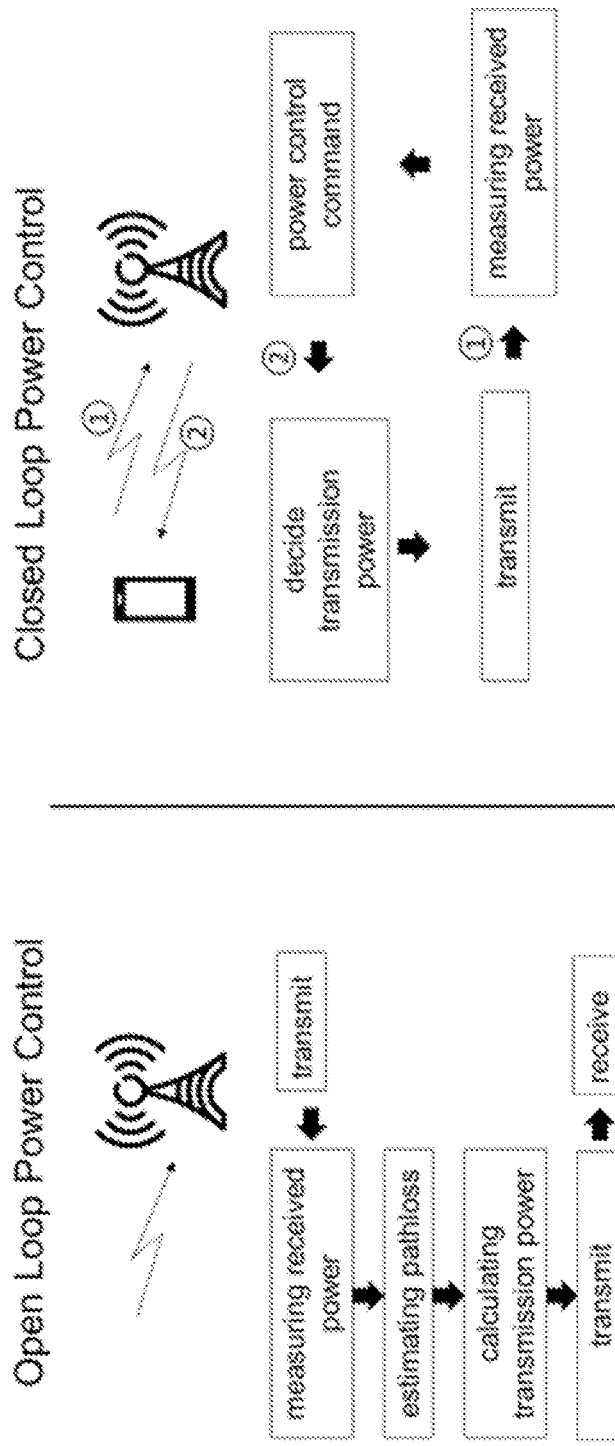
FIG. 5 illustrates an example of open and closed loop power control in LTE.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPad, Tablet, mobile terminals, smart phone, laptop embedded equipped (LEE), laptop mounted equipment (LME), USB dongles, Customer Premises Equipment (CPE) etc.

Also in some embodiments generic terminology "network node", is used. It can be any kind of network node which may comprise of a radio network node such as base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), TP (transmission point), TRP (transmission reception point), a core network node (e.g., MME, SON node, a coordinating node, positioning node, MDT node, etc.), or even an external node (e.g., 3rd party node, a node external to the current network), etc. The network node may also comprise a test equipment.

The term "frequency band" refer to a continuous span/band in the frequency region, having a minimum, a maximum and a center frequency, which is between the minimum and maximum.

In the 3GPP specification for 5G NR is provided a list of bands in which NR can operate. As per 3GPP release 15, these frequency bands are designated for different frequency ranges (FR) and current specification (Release) defines them as FR1 and FR2, where FR1 has a frequency range of 450 MHz-6000 MHz, and FR2 24250 MHz-52600 MHz. Apart from frequency range, FR, NR bands can be classified into three into categories: Frequency Division Duplex Bands (FDD), Time Division Duplex Bands (TDD) and Supplementary Bands (SUL) including Downlink Supplement Bands & Uplink Supplement Bands, such as SUL between high and low bands. NR has introduced a new notation for band which starts with "n" e.g. Band 20 is noted as n20 where in LTE it was termed as B20.

In LTE the setting of the initial uplink transmission power using open power loop control can be performed by estimating the pathloss of the downlink transmission. This is based on assumption that the power-loss in the uplink and downlink channel are similar, which is true for LTE where downlink and uplink transmission are made basically within the same frequency band, referred to as the "low" frequency band in this disclosure. However, the new RAT NR will be able to utilize a higher frequency band, referred to as the "high" frequency band in this disclosure. Thus, a dual mode UEs which can operate in both these bands may then receive and transmit on vastly different frequency bands, which will make the assumption that the power-loss in the uplink and downlink channel are similar untrue. Thus, estimating the initial uplink transmission power for a transmission in the "low frequency band" LTE channel cannot be based on the downlink pathloss of the "high frequency band" NR channel.

Hence, there is a need to be able estimating the pathloss and to set the initial uplink transmission power for systems transmitting and receiving on different frequency bands, e.g. frequency bands belonging to different RATs, such as transmitting uplink on a first RAT, RAT1, while receiving downlink on a second RAT, RAT2.

The current disclosure provides solutions to the above-mentioned problems and drawbacks by estimating the downlink channel of the first frequency band instead of the downlink channel of the second frequency band, where the downlink transmissions are received. This may be done by measuring reference signals (RSs) transmitted on the downlink channel of the first frequency band. For example, the wireless device or UE is estimating the downlink channel of the first RAT, RAT1, instead of the downlink channel of the second RAT, RAT2. For example, when the first RAT is LTE and the second RAT is NR, the LTE downlink channel would be estimated instead of the NR downlink channel, since the uplink transmission will take place in the LTE frequency band. The current disclosure comprises methods and apparatuses for transmitting and receiving one or more signals, within the first frequency band, for example belonging to a first RAT, where the signals are transmitted using an initial uplink transmission power based on downlink transmissions of reference signals in the first frequency band, where the downlink transmissions to the wireless device/UE is transmitted within a second frequency band, for example belonging to a second RAT.

A way to estimate the pathloss of the uplink channel, to be used for open loop power control, is to estimate the pathloss of the LTE channel, which is to be used for the uplink transmission. By measuring reference signals, for example CRS or synchronization signals, on the LTE downlink channel, the pathloss can be estimated, or a quantity proportional to it, and thus the initial uplink transmission power can be set.

In LTE the cell ID provides the location of the CRS. A quantity/parameter P0 is included in the open loop part, which represents the DL output power as well as other quantities needed to determine the UL setpoint (e.g. antenna gain). The open loop part of the power control does not necessarily need the explicit pathloss value but rather the pathloss combined with output power etc. Thus, for open-loop power control to work you do not need the "true" pathloss. A parameter P0 is configured in the UE which represents the eNB output power as well as other relevant factors (e.g. antenna gain etc.). Further, the antenna configuration, i.e. number of Tx antennas on the LTE downlink, i.e. number of CRS antenna ports, could be detected blindly from physical broadcast channel, PBCH, demodulation.

The two different frequency bands, the first frequency band and the second frequency band, of the current disclosure are different in that they have different center frequencies. The center frequency, Fc, is determined by where the primary synchronization signal (PSS) and secondary synchronization signal (SSS) were found. Further, the two frequency bands typically do not overlap, and may "belong" to, i.e. being primarily used by, different RATs. In one embodiment, one of the RATs have a fixed numerology, e.g. LTE, while the other have a flexible numerology, e.g. NR.

Figure 6:
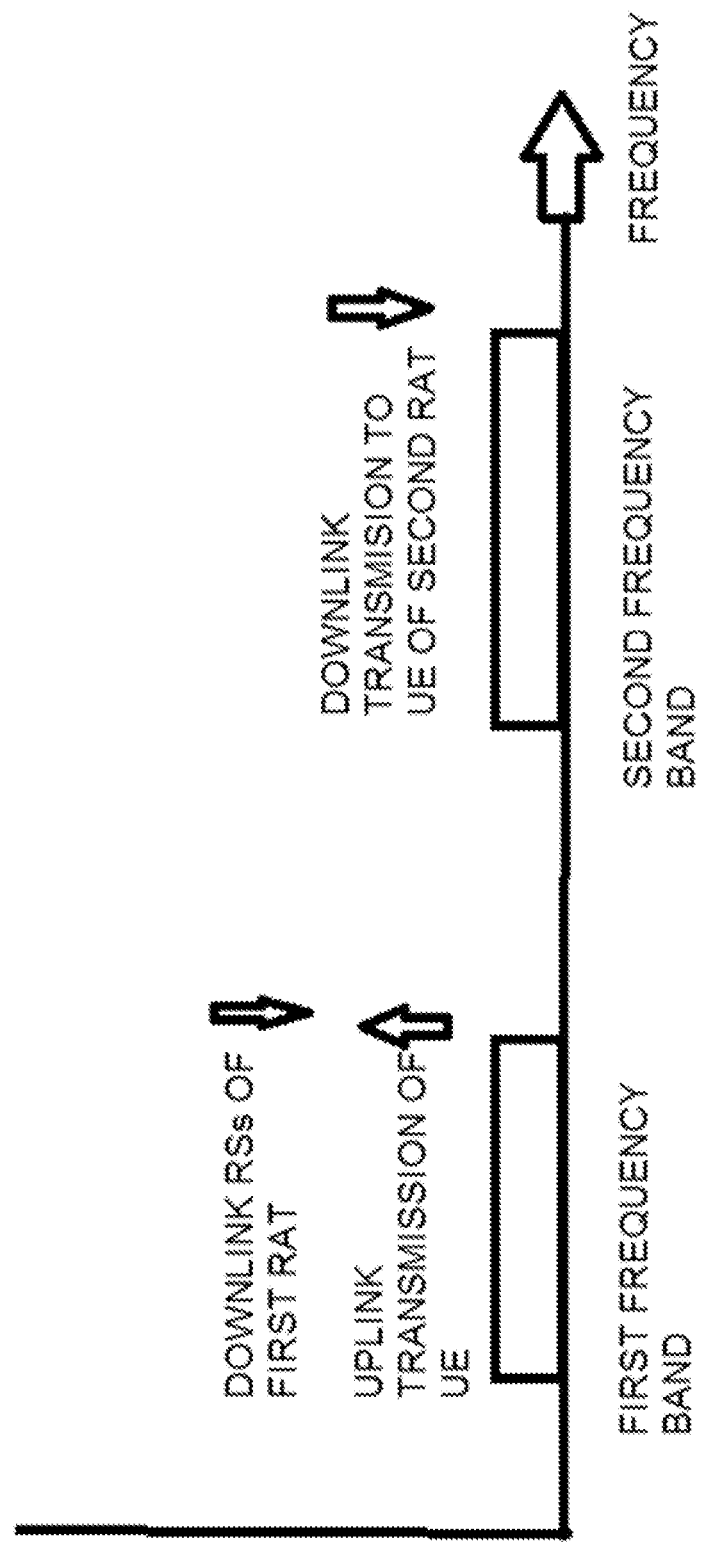
FIG. 6 illustrates an example of the transmissions in the different frequency bands.

An example embodiment of the invention is shown in FIG. 6, where the two frequency bands are depicted. The uplink transmissions from the UE to the network node takes place within the first frequency band while the downlink transmissions to the UE from the network node takes place within the second frequency band. At the same time, reference signals are transmitted from the network node within the first frequency band. Since uplink and downlink transmission to and from the UE does not take place within the same frequency band, estimating the downlink pathloss and assuming that it correlates to the uplink pathloss will give an erroneous result. The uplink pathloss may thus not be estimated based on the downlink transmission in the second frequency band and used for determination of the initial uplink transmission power. Instead, the network node provides the UE with information which enables the UE to measure reference signals, such as CRS or synchronization signals, transmitted within the first frequency band. Based on these measurements, the downlink pathloss of the first frequency band may be estimated, and from that estimation the initial uplink transmission power may be estimated/determined and set for transmitting on the uplink channel of the first frequency band.

To be able to measure the reference signals on e.g. the LTE downlink channel, or the downlink channel of another suitable RAT existing on the frequency band where the uplink for the dual-/multi-mode UEs is to be transmitted, the UE needs information regarding the signals to measure upon, e.g. information regarding which signals to measure, their location and the output power (the transmission power used). In LTE, assuming that the CRS are used, the cell ID may be sufficient, and this information could be provided to the NR terminal (UE), or NR-part of a multi-mode terminal (dual-/multi-mode UE). Information about the output power used could be RRC configures, i.e. being UE-specific, or it could be a part of the system information on the NR cell corresponding DL in another frequency, or possibly the same. The knowledge of the signals (e.g. CRS in LTE) to measure upon on RAT 1 (e.g. LTE) could for example be part of a SIB transmitted to the NR UE or signaled as part of the power control parameters. Thus, for example, the dual mode UE operating in high and low frequency bands could listen to LTE CRS signals and use them to set the UE initial uplink transmission power.

These methods give the advantage that the initial uplink transmission power can be set for a UE that transmits and receives in vastly different frequency bands, such as frequency bands of different RATs, such as LTE and NR. These methods could of course also be used for other situations/other RATs where transmission and reception of a UE is performed in different frequency bands, where the frequencies of the bands differ so vastly that the estimated pathloss from the received signal cannot be used for estimating the uplink transmission power.

The UE or wireless device of the present disclosure may be a NR-only UE which operates with high-band DL and low-band UL and where the operator still uses LTE (or some other RAT) in the low band. The UE terminal could be e.g. dual mode, but not necessarily, since knowledge about the LTE CRS (or some other signal) and measuring upon them is sufficient for the method to work.

Thus, this disclosure enables a UE or wireless device that operates in different frequency bands, such as transmits in one frequency band and receive in another to estimate and set the initial uplink transmission power. For example, a UE that is able to communicate on a second RAT of a second frequency band while the operator operates in a first frequency band of a first RAT could then receive in the second frequency band of the second RAT and transmit in the first frequency band of the first RAT by using reference signals transmitted by the network node within the first frequency band of the first RAT to estimate then uplink path loss and estimate and set the uplink transmission power.

Hence, the initial uplink power may be set based on estimated pathloss from reference signals (e.g. CRS or synchronization signals) transmitted downlink in the same frequency band as the UE will transmit uplink, when the downlink transmissions to the UE are transmitted in another frequency band and hence is unsuitable to use for pathloss estimation of the uplink channel. In one example, a first frequency band is used for transmitting uplink and a second frequency band for receiving downlink, where the pathloss is estimated using reference signals transmitted downlink on the first frequency band. The first frequency band may be for example an LTE band and the second an NR band. It is thus proposed to use e.g. LTE CRS for pathloss estimation when performing power control on e.g. SUL which have no NR DL in the same band, such as SUL between mmW and low band, and SUL+UL sharing. UL sharing between LTE and NR has been decided for both from NW and UE perspective for LTE-NR co-existence.

In 3GPP, the following agreements were reached related UL sharing for NR:

Support the following solution to single UL transmission where NW synchronization between eNodeB and gNodeB is assumed (where there is at least one LTE carrier and at least one NR carrier of a different carrier frequency)

When UE is activated with multiple UL carriers on different frequencies, time-switching of LTE UL carrier and NR UL carrier is used UL transmission timing pattern of LTE carrier and NR carrier is semi-statically shared between eNodeB and gNodeB FFS: Signaling to UE of UL transmission timing pattern UE simultaneously receives signals/channels from both NR DL carrier and LTE DL carrier For scheduling/HARQ timing of LTE FDD carrier, the following timing can be considered, e.g., for LTE:
DL-reference UL/DL configuration for TDD
DL-reference UL/DL configuration defined for FDD-SCell in TDD-FDD CA with TDD-PCell
Up to NW implementation (i.e., no RAN1 spec. impact)

For scheduling/HARQ timing of NR carrier, no special handling would be necessary Other solutions are not precluded RAN1 should consider the following scenarios as listed in R1-1711817 in the future Rel-15 work especially in terms of UL coverage Scenario 1

Scenario 2 where UL sharing is from network perspective
FFS where UL sharing from UE perspective
Aim to conclude in the next meeting; if no consensus, consider sending an LS to RANP for clarification Scenario 3

An outline of the scenario as available here as well:

Scenario #1:
DC LTE @ Low Frequency (LF)+NR @ 3.5G
Concept: LTE PUSCH/PUCCH LF, NR PUCCH 3.5G, NR PUSCH 3.5G configurable Scenario #2:
DC LTE@LF+NR@3.5G+NR@LF SUL with UL sharing
NR and LTE are collocated
Concept: LTE band uses LTE/NR UL sharing
Note: this scenario is potentially beneficial for reducing latency Scenario #3:
DC LTE@LF1+NR@ multiple bands (e.g. LF2 and 3.5G)
NR and LTE are collocated
Concept: NR CA from 3.5G to LF2
Note: this scenario is potentially beneficial for reducing latency Operation of NR and LTE coexistence over the agreed three scenarios:
Scenario 1
Scenario 1 is operating NR and LTE at two different frequency bands with the corresponding UL carriers and DL carriers operating on each corresponding frequency band. If there is possibility to transmit simultaneously in the UL on both carriers that is the most flexible operation. In such a case, the NR and LTE carrier can operate independently on the physical layer mostly (except for some power control aspects). In addition to this, there is the possibility that the UL carriers cannot be simultaneously used. In such a case, there would be a need to time division multiplex, TDM, the UL carriers. For such a case, it is only the UL carriers that directly need to be TDMed. Potentially, in addition, the DL carriers may need to be TDMed as well, due to the UL carriers being TDMed.

The impact could be handled by the network if it is provided with the correct tools to do so. HARQ feedback and potential UL scheduling could be set up to be semi-statically operated between NR and LTE carriers. One way to support the TDM of HARQ feedback is to operate with polling of HARQ feedback. The polling of HARQ feedback on the NR side is further described below in the "DL HARQ feedback" section. For UL scheduling this could be done by the gNB and eNB selecting the applicable allowed slots and subframes only. To support this operation and polled HARQ feedback, there would be a need to introduce signaling over the Xn and X2 interface that supports for operation over multiple bands to give these time patterns. The basic assumption is further that there is some form of synchronization between the NR and LTE gNB and eNB respectively. Further details on the solution is given in the "For LTE-NR coexistence in adjacent spectrum" section.

Scenario 2

In Scenario 2 the DL carriers for NR and LTE is operated as in scenario 1, however the ULs are operated on the same carrier frequency. This would inherently mean that a TDM design is performed between LTE and NR in the UL, as operating them simultaneously will most likely lead to that coverage is severely impacted in UL for both LTE and NR. Consequently, the solution of polling the HARQ feedback bits that was needed for scenario 1 also needs to be utilized for scenario 2. This is further described in the "DL HARQ feedback" section. The need for network signaling between the gNB and eNB is further similar as in scenario 1. Further it is assumed that NR and LTE carriers are synchronized to give optimal performance. The exact signaling is further given in the "For LTE-NR coexistence in overlapping spectrum" section.

An additional aspect for scenario 2 is that the UE will not have a pathloss reference for the NR carrier. How to handle this is further described in the "Power control" section.

With these mechanism, it is further sufficient to describe the UL sharing only from the network perspective and the specification impact would be to introduce the highlighted features only. It is thus proposed that it is sufficient to describe UL sharing for scenario 2 from the network perspective. The impact to 3GPP is a set of specific features that the network can choose to utilize to operate this scenario.

Scenario 3

In Scenario 3, the UE is operating an extension of scenario 1 wherein the UE has an additional NR carrier in adjacent frequencies to the LTE carriers but are not sharing the same frequency as the LTE carrier. This scenario could avoid the case of have intermodulation products in UL between the NR and LTE carrier by utilizing the NR UL carrier in the adjacent band to the LTE carrier. This will increase the coverage of the NR operation compared to scenario 1. However, sending on two UL carriers at the same time regardless whether it is LTE+LTE, NR+NR or LTE+NR will always limit the coverage of the signals sent compared to only sending one, as the power needs to be shared between the two UL carriers. Consequently, to trade DL data rate for UL coverage it would be beneficial to operating with the time domain pattern given in the "For LTE-NR coexistence in adjacent spectrum" section and also applying pooling of HARQ feedback as described in the "DL HARQ feedback" section.

There will thus be a need for several specific solutions to be introduced, such as for power control, DL HARQ feedback, and signaling over the Xn interface and enhanced X2 interface described in the sections below.

Power Control

The first aspects to consider is how power control is performed on an NR UL carrier wherein there is no corresponding NR DL within the same band, e.g. Scenario 2. The main problem is that the UE would need to have reliable pathloss reference to be able to operate in UL. There are a few ways one could think of achieving this. One is that the UE measures pathloss at the correspond NR DL carrier. However, this NR carrier would be located in another band potentially multiple 1 GHz apart. Consequently, the pathloss will be different. It may also be difficult to compensate with a fixed offset. The reason is that propagation of the signaling maybe different on the different frequency bands. Another way would instead be that the UE uses the CRS from the associated LTE DL that is available in the same band as the NR UL. The UE would then be configured with the PCI and output power of the LTE DL carrier that is most suited as pathloss reference (typical the DL carrier that is paired with the UL carrier on the same frequency). Further the UE could also be configured with BW of the LTE DL carrier to be able to perform RSRP measurement over more the 6 PRBs if the UE supports that. The UE would be configured with this already to perform random access on the NR UL. It is thus proposed that NR supports to have LTE CRS as pathloss reference. For a given NR UL carrier at a given frequency UE is configured to use an LTE carrier CRS on a given frequency as pathloss reference. The UE is configured with the PCI and the transmission power of the LTE carrier. If the LTE carrier is TDD, the NR UE is further given the LTE UL/DL configuration to be able to identify the DL subframes.

DL HARQ Feedback

For the case when an NR UL is operated on the same frequency as LTE UL from the same UE or that a UE is aggregating both NR UL an LTE UL on different frequency but cannot simultaneously transmit on both of them, there is a potential problem that the UE cannot be scheduled continuously in a corresponding LTE and NR carrier(s) at the same time in DL due to that the HARQ feedback will be transmitted in UL. Transmitting multiple PUCCH format at the same time for LTE and NR will most likely severely impact the UL coverage. In scenarios where NR coexists with LTE in the same band HARQ feedback needs to be delayed until the next available UL. One code point in the HARQ timing indication in the downlink control information, DCI, could be reserved to indicate postponed HARQ feedback. If the UE was instructed not to transmit a HARQ acknowledgement, the network could at a later time instant "poll" the UE for the status of previous receptions. Polling could also have the benefit of avoiding complicated HARQ-ACK codebooks as used in LTE and is also useful for operation in unlicensed spectrum for devices not capable of 'immediate' ACK. It could concretely be done from the network that the UE is scheduled contiguously 4 LTE and 4 NR subframes/slots and in the fifth subframe only schedules NR. This would leave room in UL to perform a polling of HARQ feedback on NR in every fifth subframe and at the same time not limiting the performance too much on the LTE carrier. On the LTE carrier, the eNB could in these occasions instead schedule another UE instead. This solution will introduce some additional delay for the HARQ feedback however, this is not great concern as typically the BLER target is very low and with operating with LDPC code it may be even lower. It is thus proposed to introduce polled HARQ-acknowledgement for PDSCH.

Signaling Over the Xn Interface and Enhanced X2 Interface

1. For LTE-NR Coexistence in Adjacent Spectrum

In order for operation to function on adjacent spectrum wherein the UE cannot transmit simultaneously on both NR and LTE there would be need for the gNB and eNB to exchange information with each other regarding the subframes/slots that are allocated to NR and LTE operation correspondingly. For such information to be fully useful, there would be a need to operate the NR carriers and LTE carriers without at least drifting too much between each other. Better operation is achieved if they are synchronized on an OFDM symbol level. A straightforward operation would be that the subframe pattern based on LTE timing as it has the longest time duration per transmission duration (always 15 kHz numerology). The signaled message contains information whether a subframe is DL on LTE and NR, DL only on LTE or NR and for UL whether it is used for NR or LTE. It is thus proposed that for LTE-NR coexistence in adjacent spectrum a subframe bit map pattern is signaled based on the LTE timing that indicates whether a subframe is DL for LTE and NR or DL only for LTE or NR; it further indicates whether an UL subframe is UL for NR or LTE. This is to support operation wherein the UE is TDM between the LTE and NR carrier. Some form of synchronization is assumed between the LTE and NR carriers, i.e. they do not drift over time significantly.

2. For LTE-NR Coexistence in Overlapping Spectrum

In order for operation to function in overlapping spectrum wherein the UE cannot transmit simultaneously on both NR and LTE there would be need for the gNB and eNB to exchange information between each other on which subframes/slots that are allocated to NR and LTE operation correspondingly. For this operation to work in a good manner it is recommended that the NR and LTE carriers are synchronized. Further there would be a need for UEs that are aggregating both NR and LTE carriers to TDM their UL carriers. Due to that they are TDMing their UL carriers they would need to TDM there DL carriers as well. The operation described here then becomes similar to the case described in section 2.4.3.1. Consequently, the same signaling between the gNB and eNB can be reused. It is thus proposed that for LTE-NR coexistence in overlapping spectrum a subframe bit map pattern is signaled based on the LTE timing that indicates whether a subframe is DL for LTE and NR or DL only for LTE or NR; it further indicates whether an UL subframe is UL for NR or LTE. This is to support operation wherein the UE is TDM between the LTE and NR carrier.

Example Operations

The proposed methods will now be described in more detail referring to FIGS. 7 and 8. It should be appreciated that FIGS. 7 and 8 comprise some operations and modules which are illustrated with a solid border and some operations and modules which are illustrated with a dashed border. The operations and modules which are illustrated with solid border are operations which are comprised in the broadest example embodiment. The operations and modules which are illustrated with dashed border are example embodiments which may be comprised in, or a part of, or are further embodiments which may be taken in addition to the operations and modules of the broader example embodiments. It should be appreciated that the operations do not need to be performed in order. Furthermore, it should be appreciated that not all of the operations need to be performed.

Figure 7:
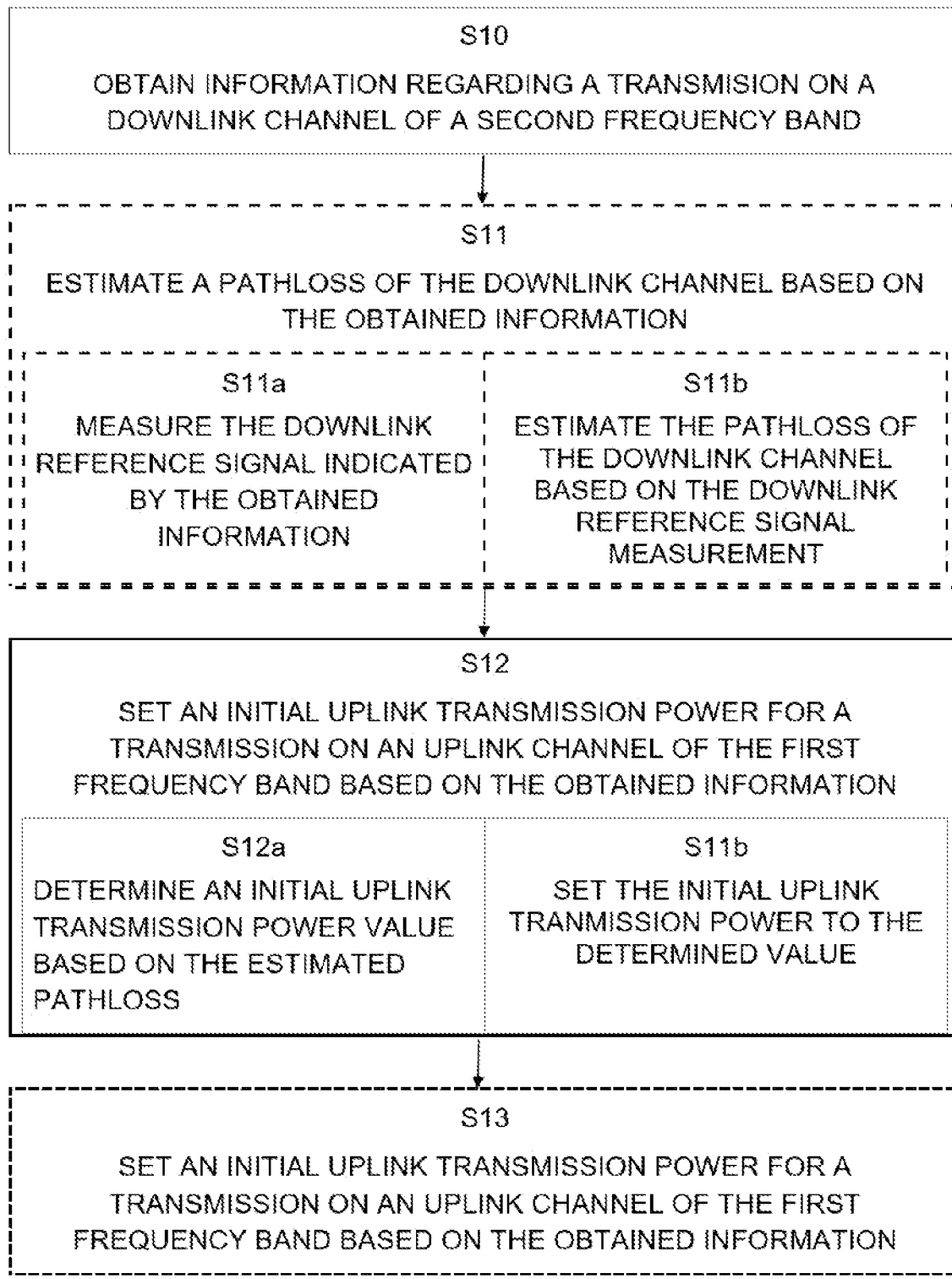
FIG. 7 flowchart of an exemplary process for transmitting on an uplink channel of a first frequency band using an initial uplink transmission power set based on measurements of downlink reference signals on a downlink channel of the first frequency band.

FIG. 7 illustrates a method, performed in a wireless device in a wireless communication system, the wireless device being capable of communicating by transmitting uplink within a first frequency band and receiving downlink within a second frequency band, for setting an initial uplink transmission power and for transmitting a signal on the uplink channel of the first frequency band using said initial uplink transmission power, the method comprising obtaining information (S10) regarding a transmission on a downlink channel of the second frequency band and setting (S12) an initial uplink transmission power for a transmission on an uplink channel of the first frequency band based on the obtained information, where the first frequency band has a different center frequency than the second frequency band. In a further aspect, the approximate center frequency of the first frequency band is 10 GHz and the approximate center frequency of the second frequency band is 2 GHz.

In one aspect, the frequency bands are non-overlapping and may "belong to", i.e. be primarily used by different RATs. For example, the first frequency band is preferably used by a first RAT, RAT1, and the second frequency band is preferably used by a second RAT, RAT2. In one aspect, the first RAT has a flexible numerology while the second RAT has a fixed numerology. In a further aspect, RAT1 is LTE and RAT2 is NR.

In one aspect, obtaining (S10) information regarding a transmission on a downlink channel of the second frequency band comprises obtaining information indicating one or more of a Cell ID of the transmitting network node and a downlink reference signal and the associated output power used. Information about downlink transmissions of reference signals in the first frequency band/of the first RAT is provided to the UE, which may then use this information to locate reference signals to measure upon. In one aspect, the obtained information indicates the location of the downlink reference signal. In one aspect, the downlink reference signal is a cell-specific reference signal, CRS.

In one embodiment, the method further comprises estimating (S11) a pathloss of the downlink channel based on the obtained (S10) information. In one aspect, estimating (S11) a path loss of the downlink channel comprises (S11a) measuring the downlink reference signal indicated by the obtained information (S10) and (S11b) estimating the pathloss of the downlink channel based on the downlink reference signal measurement. The UE may thus identify the reference signals using the information from the network node, measure the reference signals and use these measurements to estimate the pathloss (downlink and corresponding uplink) between the network node and the UE in the first frequency band/first RAT.

In one embodiment, setting (S12) an initial uplink transmission power for a transmission on an uplink channel of the first frequency band comprises determining the initial uplink transmission power (value) based on the estimated pathloss and setting the initial uplink transmission power to the determined value. Thus, the UE determines/estimates the initial uplink transmission power (the value of the initial uplink transmission power) based on the pathloss as usual, and then sets the initial uplink transmission power to the estimated/determined value. In one aspect, obtaining information (S10) regarding a transmission on a downlink channel of the second frequency band comprises obtaining information (S10) regarding a downlink transmission on the second RAT and setting (S12) an initial uplink transmission power for a transmission on an uplink channel of the first frequency band comprises determining (S12a) an initial uplink transmission power for a transmission on an uplink channel of the first RAT and setting (S12b) the initial uplink transmission power to the determined value. In one aspect, obtaining (S10) information regarding a transmission on a downlink channel of the second frequency band comprises receiving the information from a network node, such as in a system information block, SIB, of a first RAT.

A corresponding method, performed in a network node, for receiving a receiving a signal in a first frequency band, wherein the signal is transmitted within a first frequency band of e.g. a first RAT, and the initial uplink transmission power is set based on measurements of reference signals transmitted within the first frequency band, will now be described referring to FIG. 8. FIG. 8 illustrates a method for use in a network node in a wireless communication system for receiving an uplink transmission in a first frequency band form a wireless device capable of communicating by transmitting uplink within a first frequency band and receiving downlink within a second frequency band, the method comprising transmitting (S1) information regarding a transmission on a downlink channel of the second frequency band to the wireless device, and receiving (S2), from the wireless device, a transmission on the uplink channel of a first frequency band using an initial uplink transmission power which is set based on the transmitted information, where the first frequency band has a different center frequency than the second frequency band, such as e.g. a higher center frequency. Thus, the network node (e.g. base station) provides the wireless device/UE with information enabling the wireless device to set the initial uplink transmission power for transmitting uplink to the network node in a first frequency band/first RAT while the receiving transmissions from the network node in a secondary frequency band/on a second downlink channel in the downlink. In one aspect, the network node transmits information to the wireless device, e.g. information is transmitted in a SIB such as a SIB of a first RAT, enabling the wireless device to identify reference signals transmitted from the network node in the first frequency band/on a first downlink channel, which can then be used for estimation of the pathloss and the initial uplink transmission power using open power loop control methods.

In one aspect, the transmitted information indicates information regarding a transmission on a downlink channel of the second frequency band comprises obtaining information indicating one or more of a Cell ID of the transmitting network node and a downlink reference signal. In a further aspect, the first frequency band is preferably used by a first RAT, RAT1, and the second frequency band is preferably used by a second RAT, RAT2. In one aspect, the network node is a gNB.

Example Node Configurations

Figure 9:
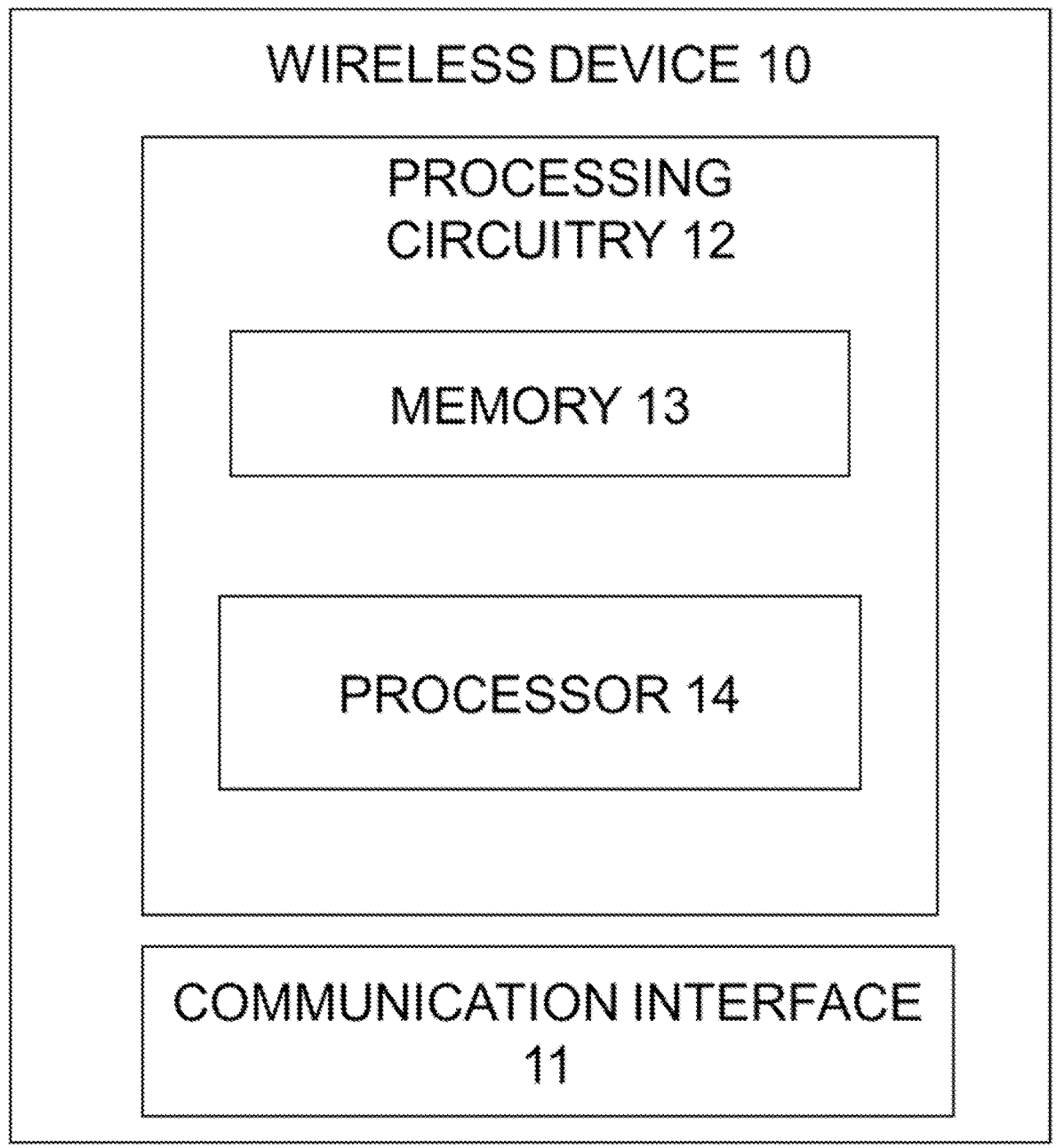
FIG. 9 is a block diagram illustrating a wireless device configured to transmit on an uplink channel of a first frequency band using an initial uplink transmission power set based on measurements of downlink reference signals on a downlink channel of the first frequency band.

Turning now to FIG. 9, which is a schematic diagram that illustrates some modules of an example embodiment of a wireless device being configured for transmitting a physical uplink control channel and/or determining a physical uplink control channel structure. The wireless device is configured to implement all aspects of the methods described in relation to FIG. 7. The wireless device 10 comprises a radio communication interface (i/f) 11 configured for communication with a network node. The radio communication interface 11 may be adapted to communicate over one or several radio access technologies. If several technologies are supported, the node typically comprises several communication interfaces, e.g. one WLAN or Bluetooth communication interface and one cellular communication interface, including LTE or NR.

The wireless device 10 comprises a controller, CTL, or a processing circuitry 12 that may be constituted by any suitable Central Processing Unit, CPU, microcontroller, Digital Signal Processor, DSP, etc. capable of executing computer program code. The computer program may be stored in a memory, MEM 13. The memory 13 can be any combination of a Read And write Memory, RAM, and a Read Only Memory, ROM. The memory 13 may also comprise persistent storage, which, for example, can be any single one or combination of magnetic memory, optical memory, or solid state memory or even remotely mounted memory. According to some aspects, the disclosure relates to a computer program comprising computer program code which, when executed, causes a wireless device to execute the methods described above and below. According to some aspects the disclosure pertains to a computer program product or a computer readable medium holding said computer program. The processing circuitry may further comprise both a memory 13 storing a computer program and a processor 14, the processor being configured to carry out the method of the computer program.

One embodiment includes a wireless device (10), configured to operate in a wireless communication system (100) and being capable of communicating by transmitting uplink within a first frequency band and receiving downlink within a second frequency band, configured for setting an initial uplink transmission power of an uplink transmission on an uplink channel of the first frequency band and for transmitting a signal uplink to a network node (20) using said initial uplink transmission power, the wireless device (10) comprising a communication interface (11) and processing circuitry (12) configured to cause the wireless device (10) to obtain information regarding a transmission on a downlink channel of the second frequency band; and to set an initial uplink transmission power for a transmission on an uplink channel of the first frequency band based on the obtained information, where the first frequency band has a different center frequency than the second frequency band.

In one aspect, the processing circuitry (12) is further configured to estimate a pathloss of the downlink channel based on the obtained information. In a further aspect, the processing circuitry (12) is further configured to transmit on the uplink channel of the first frequency band using the set initial uplink transmission power.

Further, embodiments relating to a host computer and activities therein, is also comprised in the current disclosure. A host computer (or server, or application server), which is under the ownership or control of a service provider, or which is operated by the service provider or on their behalf is connected to the RAN (e.g., cellular network) via the core network.

In one aspect is comprised a user equipment (UE) or wireless device configured to communicate with a base station or network node, the UE comprising a radio interface and processing circuitry configured to obtain information regarding a transmission on a downlink channel of the second frequency band, estimate a pathloss of the downlink channel based on the obtained information, set an initial uplink transmission power for a transmission on an uplink channel of the first frequency band based on the obtained information, and transmit on the uplink channel of the first frequency band using the determined initial uplink transmission power.

In a further aspect is comprised a communication system including a host computer comprising: a communication interface configured to receive user data originating from a transmission from a user equipment (UE) to a base station, wherein the UE comprises a radio interface and processing circuitry, the UE's processing circuitry configured to obtain information regarding a transmission on a downlink channel of the second frequency band; estimate a pathloss of the downlink channel based on the obtained information; set an initial uplink transmission power for a transmission on an uplink channel of the first frequency band based on the obtained information; and transmit on the uplink channel of the first frequency band using the determined initial uplink transmission power.

In one aspect, the communication system further includes the UE. In another aspect, the communication system further includes the base station, wherein the base station comprises a radio interface configured to communicate with the UE and a communication interface configured to forward to the host computer the user data carried by a transmission from the UE to the base station. In a further aspect, the processing circuitry of the host computer is configured to execute a host application; and the UE's processing circuitry is configured to execute a client application associated with the host application, thereby providing the user data. Ina a further aspect the processing circuitry of the host computer is configured to execute a host application, thereby providing request data; and the UE's processing circuitry is configured to execute a client application associated with the host application, thereby providing the user data in response to the request data.

In a further embodiment is defined a method implemented in a communication system including a host computer, a base station and a user equipment (UE), the method comprising:

at the host computer, receiving user data transmitted to the base station from the UE, wherein the UE obtains information regarding a transmission on a downlink channel of the second frequency band; estimates a pathloss of the downlink channel based on the obtained information; sets an initial uplink transmission power for a transmission on an uplink channel of the first frequency band based on the obtained information; and transmits on the uplink channel of the first frequency band using the determined initial uplink transmission power.

In one aspect, the method comprising, at the UE, providing the user data to the base station. The method further comprising: at the UE, executing a client application, thereby providing the user data to be transmitted; and at the host computer, executing a host application associated with the client application. The method further comprising: at the UE, executing a client application; and at the UE, receiving input data to the client application, the input data being provided at the host computer by executing a host application associated with the client application, wherein the user data to be transmitted is provided by the client application in response to the input data.

According to some aspects the processing circuitry 12 or the wireless device 10 comprises units 41-44 configured to perform the methods described above. The modules are implemented in hardware or in software or in a combination thereof. The modules are according to one aspect implemented as a computer program stored in a memory 13 which run on the processing circuitry 12.

According to some aspects the wireless device 10 or the processing circuitry 12 comprises units (41-44) operative to obtain information regarding a transmission on a downlink channel of the second frequency band (41), to estimate a pathloss of the downlink channel based on the obtained information (42), to set an initial uplink transmission power for a transmission on an uplink channel of the first frequency band based on the obtained information (43), and to transmit on the uplink channel of the first frequency band using the set initial uplink transmission power (44).

Figure 10:
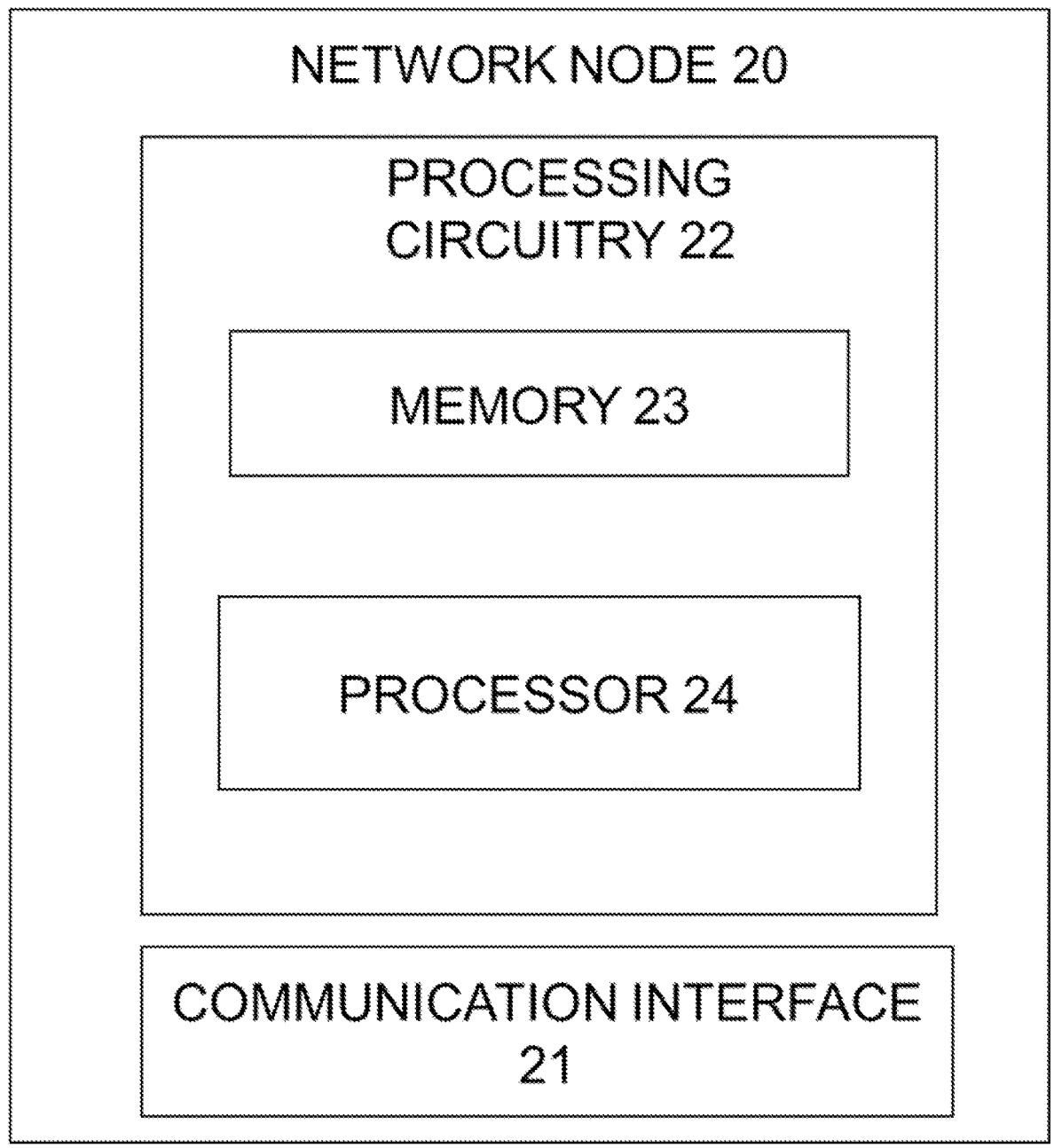
FIG. 10 is a block diagram illustrating a network node configured to receive an uplink transmission on an uplink channel using an initial uplink transmission power set based on measurements of downlink reference signals on a downlink channel of the first frequency band transmitted by the network node.

FIG. 10 illustrates an example of a network node 20, which incorporates some of the example embodiments discussed above. FIG. 10 discloses a network node 20 being configured to operate in a wireless communication system (100), configured for receiving a physical uplink control channel from a wireless device (10), the network node (20) comprising a communication interface (21); and processing circuitry (22) configured to cause the network node (20):

to transmitting information regarding a transmission on a downlink channel of the second frequency band to the wireless device (10); and to receive, from the wireless device (10), a transmission on the uplink channel of a first frequency band using an initial uplink transmission power which is set based on the transmitted information, where the first frequency band has a different center frequency than the second frequency band.

As shown in FIG. 10, the network node 20 comprises a radio communication interface or radio circuitry 21 configured to receive and transmit any form of communications or control signals within a network. It should be appreciated that the communication interface (radio circuitry) 21 is according to some aspects comprised as any number of transceiving, receiving, and/or transmitting units or circuitry. It should further be appreciated that the radio circuitry 21 can e.g. be in the form of any input/output communications port known in the art. The radio circuitry 21 e.g. comprises RF circuitry and baseband processing circuitry (not shown).

The network node 20 according to some aspects further comprises at least one memory unit or circuitry 23 that is in communication with the radio circuitry 21. The memory 23 can e.g. be configured to store received or transmitted data and/or executable program instructions. The memory 23 is e.g. configured to store any form of contextual data. The memory 23 can e.g. be any suitable type of computer readable memory and can e.g. be of volatile and/or non-volatile type. The network node 20 further comprises processing circuitry 22 which configured to cause the network node 20 to transmit information regarding a transmission on a downlink channel of the second frequency band to the wireless device (10); and to receive, from the wireless device (10), a transmission on the uplink channel of a first frequency band using an initial uplink transmission power which is set based on the transmitted information.

The processing circuitry 22 is e.g. any suitable type of computation unit, e.g. a microprocessor, Digital Signal Processor, DSP, Field Programmable Gate Array, FPGA, or Application Specific Integrated Circuit, ASIC, or any other form of circuitry. It should be appreciated that the processing circuitry need not be provided as a single unit but is according to some aspects provided as any number of units or circuitry. The processing circuitry may thus comprise both a memory 23 for storing a computer program and a processor 24, the processor being configured to carry out the method of the computer program.

The controller, CTL, or processing circuitry 22 is according to some aspects capable of executing computer program code. The computer program is e.g. stored in a memory, MEM, 23. The memory 23 can be any combination of a Read And write Memory, RAM, and a Read Only Memory, ROM. The memory 23 in some situations also comprise persistent storage, which, for example, can be any single one or combination of magnetic memory, optical memory, or solid state memory or even remotely mounted memory. It should be appreciated that the processing circuitry need not be provided as a single unit but is according to some aspects provided as any number of units or circuitry. According to some aspects, the disclosure relates to a computer program comprising computer program code which, when executed, causes a network node to execute the methods described above and below.

According to some aspects the processing circuitry 22 or the network node comprise units (51-52) operative to transmitting information regarding a transmission on a downlink channel of the second frequency band to the wireless device (51), and to receive, from the wireless device, a transmission on the uplink channel of a first frequency band using an initial uplink transmission power which is set based on the transmitted information (52).

The content of this disclosure thus enables the setting of an initial uplink transmission power for a wireless device using open power loop control methods, where the wireless device transmits and receives within different non-overlapping frequency bands, wherein these bands may be primarily used by different RATs.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

According to some aspects is provided a computer program comprising computer program code which, when executed in a wireless device, causes the wireless device to execute the methods in the wireless device described above.

According to some aspects is provided a computer program comprising computer program code which, when executed in a network node, causes the network node to execute the methods in the network node described above.

According to some aspects is provided a carrier containing any one of the computer programs mentioned above, wherein the carrier is one of an electronic signal, optical signal, radio signal, or computer readable storage medium.

The invention claimed is:

1. A method for use in a wireless device in a wireless communication system, the wireless device being configured to communicate by transmitting uplink within a first frequency band and receiving downlink within a second frequency band, for setting an initial uplink transmission power, the method comprising:
obtaining information regarding a transmission on a downlink channel of the first frequency band; and
setting an initial uplink transmission power for a transmission on an uplink channel of the first frequency band based on the obtained information, the first frequency band having a different center frequency than the second frequency band.

2. The method of claim 1 further comprising:
estimating a pathloss of the downlink channel based on the obtained information.

3. The method of claim 2, wherein setting an initial uplink transmission power for a transmission on an uplink channel of the first frequency band comprises determining the initial uplink transmission power based on the estimated pathloss and setting the initial uplink transmission power to the determined value.

4. The method of claim 1 further comprising:
transmitting on the uplink channel of the first frequency band using the set initial uplink transmission power.

5. The method of claim 1, wherein obtaining information regarding a transmission on a downlink channel of the first frequency band comprises obtaining information indicating at least one of a Cell ID of the transmitting network node and a downlink reference signal and the associated output power used.

6. The method of claim 5, wherein the obtained information indicates the location of the downlink reference signal.

7. The method of claim 5, wherein the downlink reference signal is one of a cell-specific reference signal, CRS, and a synchronization signal.

8. The method of claim 5, wherein estimating a pathloss of the downlink channel comprises measuring the downlink reference signal indicated by the obtained information and estimating the pathloss of the downlink channel based on the downlink reference signal measurement.

9. The method of claim 1, wherein the first frequency band is used by a first radio access technology (RAT), RAT1, and the second frequency band is used by a second RAT, RAT2.

10. The method of claim 9, wherein the first RAT has a flexible numerology while the second RAT has a fixed numerology.

11. The method of claim 9, wherein RAT1 is Long Term Evolution and RAT2 is New Radio.

12. The method of claim 9, wherein obtaining information regarding a transmission on a downlink channel of the first frequency band comprises obtaining information regarding a downlink transmission on the first RAT, and setting an initial uplink transmission power for a transmission on an uplink channel of the first frequency band comprises determining an initial uplink transmission power for a transmission on an uplink channel of the first RAT and setting the initial uplink transmission power to the determined value.

13. The method of claim 1, wherein obtaining information regarding a transmission on a downlink channel of the first frequency band comprises receiving the information from a network node, such as in a system information block of a first radio access technology.

14. A method for use in a network node in a wireless communication system for receiving an uplink transmission in a first frequency band form a wireless device configured to communicate by transmitting uplink within a first frequency band and receiving downlink within a second frequency band, the method comprising:
transmitting information regarding a transmission on a downlink channel of the first frequency band to the wireless device; and
receiving, from the wireless device, a transmission on the uplink channel of the first frequency band using an initial uplink transmission power which is set based on the transmitted information, the first frequency band having a different center frequency than the second frequency band.

15. The method of claim 14, wherein the transmitted information indicates information regarding a transmission on a downlink channel of the first frequency band comprises obtaining information indicating at least one of a Cell ID of the transmitting network node and a downlink reference signal.

16. The method of claim 14, wherein the first frequency band is used by a first radio access technology, RAT1, and the second frequency band is used by a second radio access technology, RAT2.

17. A wireless device, configured to operate in a wireless communication system and configured to communicate by transmitting uplink within a first frequency band and receiving downlink within a second frequency band, configured for setting an initial uplink transmission power, the wireless device comprising:
a communication interface and processing circuitry configured to cause the wireless device:
to obtain information regarding a transmission on a downlink channel of the first frequency band; and
to set an initial uplink transmission power for a transmission on an uplink channel of the first frequency band based on the obtained information, the first frequency band having a different center frequency than the second frequency band.

18. The wireless device of claim 17, wherein the processing circuitry is further configured to:
estimate a pathloss of the downlink channel based on the obtained information.

19. The wireless device of claim 17, wherein the processing circuitry is further configured to cause:
transmission on the uplink channel of the first frequency band using the set initial uplink transmission power.

20. A network node, configured to operate in a wireless communication system, configured for receiving a physical uplink control channel from a wireless device, the network node comprising:
a communication interface and processing circuitry configured to cause the network node:
to transmit information regarding a transmission on a downlink channel of the first frequency band to the wireless device; and
to receive, from the wireless device, a transmission on the uplink channel of a first frequency band using an initial uplink transmission power which is set based on the transmitted information, the first frequency band having a different center frequency than the second frequency band.

* * * * *